(12) United States Patent
Asai

(10) Patent No.: US 9,446,660 B2
(45) Date of Patent: Sep. 20, 2016

(54) VEHICLE GRILL SHUTTER, VEHICLE FLAP MEMBER, AND ACTUATOR

(71) Applicant: FALTEC Co., Ltd., Kawasaki-shi (JP)

(72) Inventor: Yoshiyuki Asai, Kawasaki (JP)

(73) Assignee: FALTEC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/807,152

(22) Filed: Jul. 23, 2015

(65) Prior Publication Data

US 2016/0089971 A1 Mar. 31, 2016

(51) Int. Cl.
*B60K 11/08* (2006.01)
*B62D 25/08* (2006.01)

(52) U.S. Cl.
CPC .......... *B60K 11/085* (2013.01); *B62D 25/085* (2013.01)

(58) Field of Classification Search
CPC ................................ B60K 11/085; F01P 7/12
See application file for complete search history.

(56) References Cited

U.S. PATENT DOCUMENTS

| 2006/0060401 | A1* | 3/2006 | Bole | B62D 35/001 180/68.1 |
| 2010/0243352 | A1* | 9/2010 | Watanabe | B60K 11/085 180/68.1 |
| 2011/0048691 | A1* | 3/2011 | Shin | F01P 7/12 165/299 |
| 2015/0090508 | A1 | 4/2015 | Chappex | |

FOREIGN PATENT DOCUMENTS

EP 2641768 A1 9/2013
JP A-2013-199178 10/2013

OTHER PUBLICATIONS

European Search Report for EP15177869.3 mailed on Feb 25, 2016.

* cited by examiner

*Primary Examiner* — Bryan Evans
(74) *Attorney, Agent, or Firm* — Moser Taboada

(57) ABSTRACT

A vehicle grill shutter includes an actuator, a flap member which is configured to rotate between a closed position and an open position by the actuator, and an attachment position regulation mechanism which connects the actuator and the flap member, and is configured such that the flap member is connected to the actuator only when the flap member is positioned at a regular position with respect to the actuator.

6 Claims, 7 Drawing Sheets

VEHICLE GRILL SHUTTER, VEHICLE FLAP MEMBER, AND ACTUATOR

CROSS-REFERENCE TO RELATED APPLICATIONS

Priority is claimed on Japanese Patent Application No. 2014-199646, filed on Sep. 30, 2014, and Japanese Patent Application No. 2014-262635, filed on Dec. 25, 2014, the contents of which are incorporated herein by reference.

BACKGROUND OF THE INVENTION

1. Field of the Invention

The present invention relates to a vehicle grill shutter, a vehicle flap member, and an actuator.

2. Description of Related Art

In recent years, in order to improve fuel consumption performance of a vehicle, or the like, a vehicle grill shutter may be provided in a grill opening portion. For example, as disclosed in Japanese Unexamined Patent Application First Publication No. 2013-199178, a vehicle grill shutter includes an actuator, a plurality of flap members, and a link member by which the flap members are connected to each other, in which all flap members are interlocked by rotating some flap members using the actuator.

When the vehicle grill shutter is assembled, an operation which attaches the flap member to the actuator is performed. In this case, when an operator incorrectly sets an attachment position of the flap member with respect to the actuator, the position of the flap member is always deviated from the original position in the assembled vehicle grill shutter. Accordingly, for example, even when the flap member is controlled so as to be completely closed, the flap member does not reach a completely closed position. Therefore, improvement of sufficient fuel consumption performance may not be achieved.

In addition, generally, connection between the actuator and the flap member is performed by fitting a shaft portion provided on one of the actuator and the flap member to a fitting hole provided on the other of the actuator and the flap member. However, if a slight gap exists between the shaft portion and the inner wall surface of the fitting hole, the shaft portion vibrates in the fitting hole due to vibration generated when the position of the flap member is changed or when a vehicle travels, or the like. Accordingly, the adjacent flap members are rattled, and noise or the like occurs. In addition, when the flap member rotates, the contact range between the shaft portion and the fitting hole decreases, and a driving force of the actuator may not be correctly transmitted to the flap member.

The present invention is made in consideration of the above-described problems, and an object thereof is to prevent erroneous assembly of the flap member with respect to the actuator in a vehicle grill shutter and a vehicle flap member.

In addition, another object of the present invention is to prevent the shaft portion from vibrating in the fitting hole, prevent occurrence of noise or the like, and correctly transmit the driving force of the actuator to the flap member, in the vehicle grill shutter in which the shaft portion is fitted to the fitting hole and the flap member and the actuator are connected to each other.

SUMMARY OF THE INVENTION

The present invention adopts the following configurations to achieve the above-described objects.

A vehicle grill shutter according to a first aspect of the present invention, includes: an actuator; a flap member which is configured to rotate between a closed position and an open position by the actuator; and an attachment position regulation mechanism which is configured to connect the actuator and the flap member only when the flap member is positioned at a regular position with respect to the actuator.

The attachment position regulation mechanism may include a shaft portion which is provided on one of the actuator and the flap member, and has a rotationally asymmetrical shape when viewed from an attachment direction, and an attachment portion having a fitting hole which is provided on the other of the actuator and the flap member and to which the shaft portion is fitted.

The shaft portion may include a plurality of teeth which are arranged at equal intervals in a circumferential direction, and a notch portion which is formed by notching at least one of the plurality of teeth.

The flap member may include a flap main body, the shaft portion, a breaking portion which is interposed between the flap main body and the shaft portion and has a smaller diameter than a diameter of the shaft portion, and a reinforcing rib which is provided along the breaking portion with respect to a circumferential surface of the breaking portion, in which the reinforcing rib may be disposed to overlap with the notch portion of the shaft portion when viewed from the attachment direction.

The notch portion may be disposed at a position at which the notch portion is horizontally separated from a center of the shaft portion when the flap member is positioned at the closed position.

A vehicle flap member according to a second aspect of the present invention is rotated between a closed position and an open position by an actuator, and includes a shaft portion or an attachment portion having a fitting hole in which a shape is rotationally asymmetrical when viewed from an attachment direction, as a connection portion between the vehicle flap member and the actuator.

A vehicle grill shutter according to a third aspect of the present invention, includes: an actuator; a flap member in which a position is changed between a closed position and an open position by the actuator; a shaft portion which is provided on one of the actuator and the flap member; an attachment portion having a fitting hole which is provided on the other of the actuator and the flap member, and into which the shaft portion is fitted; and an interposing portion which is interposed between the shaft portion and an inner wall surface of the fitting hole.

The shaft portion may have a gear shape which includes a plurality of teeth arranged in a circumferential direction, and the interposing portion may be formed by a protrusion which is provided integrally with the tooth on both sides of the tooth in the circumferential direction of the shaft portion.

A notch portion which is formed by notching at least one of the plurality of teeth may be provided, and the protrusion may be provided with respect to each of the teeth.

The protrusion may extend in a direction along an axial center of the shaft portion, and a height of the protrusion from the surface of the tooth may decrease toward a tip of the shaft portion.

The protrusion may include an apex which is configured to come into contact with an inner wall surface of the fitting hole, and the apex may be flattened.

In a vehicle flap member according to a fourth aspect of the present invention, a position of the vehicle flap member is changed between a closed position and an open position by an actuator, and the vehicle flap member includes: a shaft portion which is fitted into a fitting hole provided in the actuator; and an interposing portion which is interposed between the shaft portion and the fitting hole.

In a vehicle flap member according to a fifth aspect of the present invention, a position of the vehicle flap member is changed between a closed position and an open position by an actuator, and the vehicle flap member includes: an attachment portion having a fitting hole into which a shaft portion provided in the actuator is fitted; and an interposing portion which is interposed between the shaft portion and the fitting hole.

An actuator according to a sixth aspect of the present invention, includes: a shaft portion which is fitted into a fitting hole provided in the vehicle flap member; and an interposing portion which is interposed between the shaft portion and the fitting hole.

An actuator according to a seventh aspect of the present invention, includes: an attachment portion having a fitting hole into which a shaft portion provided in the vehicle flap member is fitted; and an interposing portion which is interposed between the shaft portion and the fitting hole.

According to the aspects of the present invention, it is possible to attach the flap member to the actuator only at a regular position with respect to the actuator by the attachment position regulation member. Accordingly, it is possible to prevent an operator from incorrectly setting the attachment position of the flap member with respect to the actuator, and it is possible to prevent erroneous assembly of the flap member with respect to the actuator in the vehicle grill shutter and the vehicle flap member.

In addition, according to the aspects of the present invention, the interposing portion is provided, which is interposed between the shaft portion which is provided on one of the actuator and the flap member and the inner wall surface of the fitting hole which is provided on the other of the actuator and the flap member. The interposing portion is interposed between the shaft portion and the inner wall surface of the fitting hole. Therefore, it is possible to prevent vibration of the shaft portion with respect to the fitting hole. Therefore, according to the aspects of the present invention, in the vehicle grill shutter in which the flap member and the actuator are connected to each other by fitting the shaft portion into the fitting hole, it is possible to prevent the shaft portion from vibrating in the fitting hole, and it is possible to prevent the occurrence of noise or the like. In addition, it is possible to correctly transmit a driving force of the actuator to the flap member through the interposing portion.

DETAILED DESCRIPTION OF THE INVENTION

Hereinafter, embodiments with respect to a vehicle grill shutter, a vehicle flap member, and an actuator according to the present invention will be described with reference to the drawings. Moreover, in the following drawings, in order to allow the size of each member to be a recognizable size, the scale of each member is appropriately changed.

First Embodiment

Figure 1:
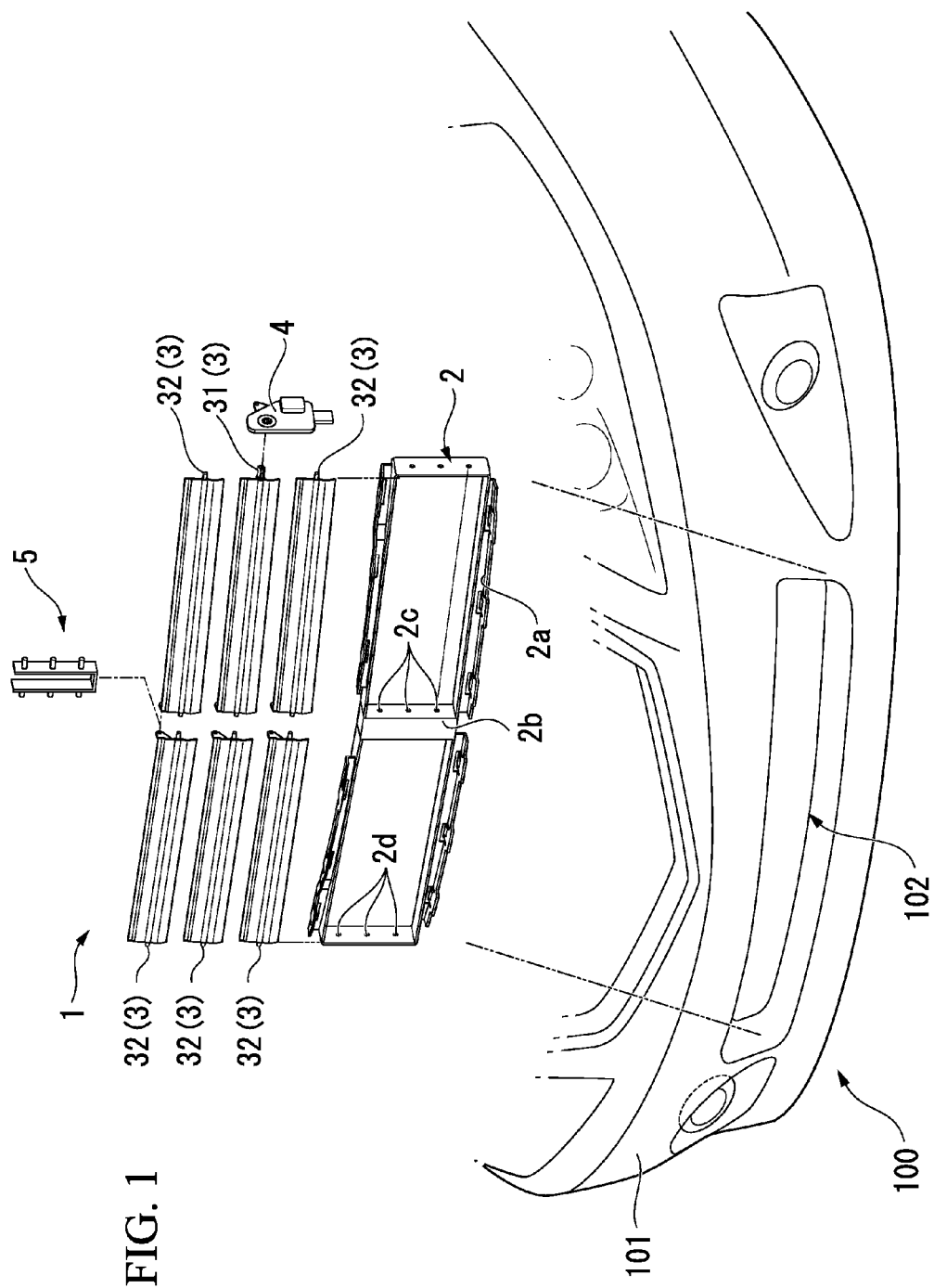
FIG. 1 is an exploded perspective view of a vehicle grill shutter in a first embodiment of the present invention and is a perspective view showing a front portion of a vehicle.

FIG. 1 is an exploded perspective view of a vehicle grill shutter 1 in a first embodiment of the present invention and is a perspective view showing a front portion of a vehicle. As shown in FIG. 1, a front bumper 101 is provided on a front surface of a vehicle 100 along a vehicle width direction. A grill opening 102 communicating with an engine room is formed on the lower portion side of the front bumper 101. As shown in FIG. 1, a vehicle grill shutter 1 is fixed to a vehicle body so as to be disposed inside the grill opening 102.

As shown in FIG. 1, the vehicle grill shutter 1 includes a frame 2, flap members 3, an actuator 4, and a link member 5. The frame 2 includes an outer edge portion 2a which is formed in an approximately rectangular shape when viewed from the front surface of the vehicle 100, and a support column 2b which vertically extends from the center of the outer edge portion 2a and is attached to the outer edge portion 2a. In the frame 2, a region surrounded by the outer edge portion 2a having an approximately rectangular shape is horizontally divided by the support column 2b. For example, the frame 2 is formed of a composite material including a polypropylene resin and glass fibers.

In the region surrounded by the outer edge portion 2a of the frame 2, three flap members 3 (vehicle flap member) are disposed in each region which is divided by the support column 2b. In order to rotatably support the flap members 3, the frame 2 includes a plurality of shaft holes 2c which are provided on the side of the support column 2b, and a plurality of shaft holes 2d which are provided on the outer edge portion 2a. One shaft hole 2c and one shaft hole 2d are provided with respect to the one flap member 3, and the shaft hole 2c and the shaft hole 2d which support the same flap member 3 are provided so as to horizontally oppose each other.

Three flap members 3 are vertically arranged with respect to both the right and left sides of the support column 2b, and in the present embodiment, a total of six flap members are provided. Among the flap members 3, one flap member 3 is a drive flap member 31 which is directly connected to the actuator 4, and the remaining five flap members 3 are driven flap members 32 which are connected to the drive flap member 31 by the link member 5. In each flap member 3, an end portion on one side in the horizontal direction is rotatably supported by the shaft hole 2c provided on the support column 2b, and an end portion on the other side is rotatably supported by the shaft hole 2d provided on the outer edge portion 2a. Moreover, the flap members 3 have approximately the same shape, and each of the flap members rotates between a closed position at which a projection area in a movable range is the greatest when the front surface side of the vehicle 100, and an open position at which the projection area is the smallest. In addition, the flap members 3 are provided so that the flap members 3 partially overlap each other in an up-down direction in the case where the flap members 3 are positioned at the closed positions when viewed from the front surface side of the vehicle 100, and outside air is prevented from passing through the outer edge portion 2a of the frame 2 by the flap members 3 positioned at the closed positions. Similarly to the frame 2, for example, each of the flap members 3 is formed of a composite material including a polypropylene resin and glass fibers.

The drive flap member 31 is the flap member 3 which is disposed at the center among three flap members 3 vertically arranged on the one side of the support column 2b, and power is transmitted from the actuator 4 to the drive flap member 31. Therefore, the drive flap member 31 is rotated in a state where both the right and left ends are rotatably supported. Accordingly, the position of the drive flap member 31 is changed between the closed position and the open position. The actuator 4 includes a servo motor, a solenoid, or the like as a drive source, and generates power for rotating the flap members 3 according to a control of an engine control unit. In addition, an attachment structure between the drive flap member 31 and the actuator 4 will be described in detail below. The link member 5 connects the drive flap member 31 and the driven flap members 32, and transmits the power, which is transmitted from the actuator 4 to the drive flap member 31, to the driven flap member 32. Accordingly, the driven flap members 32 are rotated in synchronization with the drive flap member 31.

In the vehicle grill shutter 1 according to the present embodiment, the flap members 3 are positioned at the closed positions by the actuator 4. Therefore, the outside air is prevented from flowing into the flap members through the grill opening 102. In addition, the flap members 3 are positioned at the open positions by the actuator 4. Therefore, the outside air can flow into the flap members through the grill opening 102.

In addition, the positions of the flap members 3 can be arbitrarily set between the closed positions and the open positions. In this case, the outside air having a flow rate according to the position (that is, opening degree) of each of the flap members 3 can flow into the flap member through the grill opening 102.

Figure 2A:
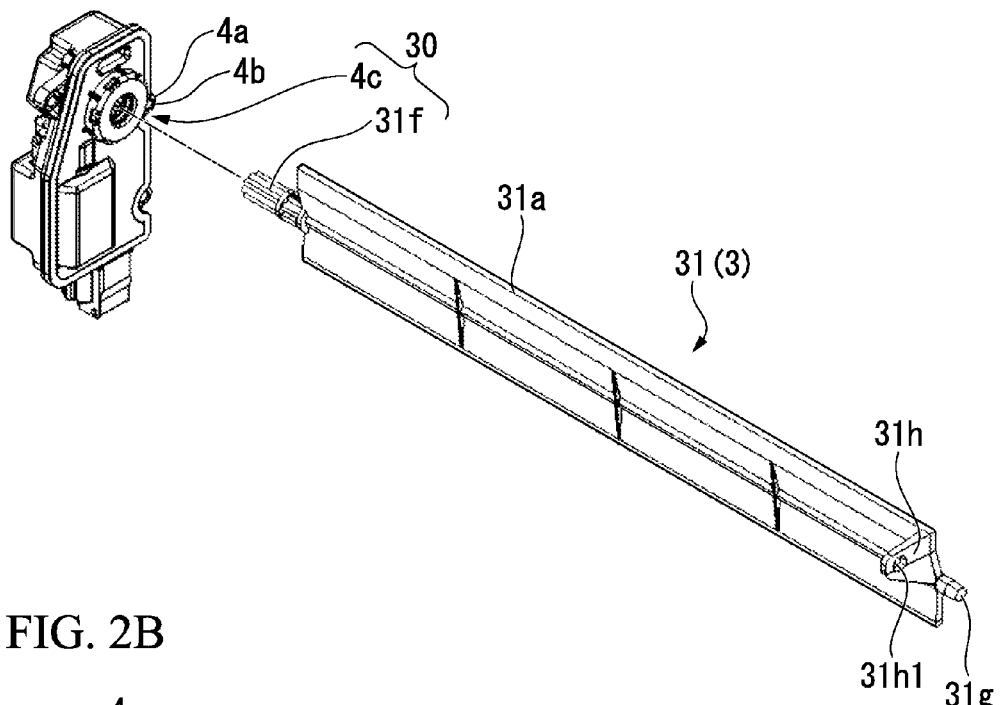
FIG. 2A is a perspective view when a drive flap member and an actuator included in a vehicle grill shutter in the first embodiment of the present invention are viewed from the side in which an engine room is arranged, and shows a state where the drive flap member and the actuator are disassembled.
Figure 2B:
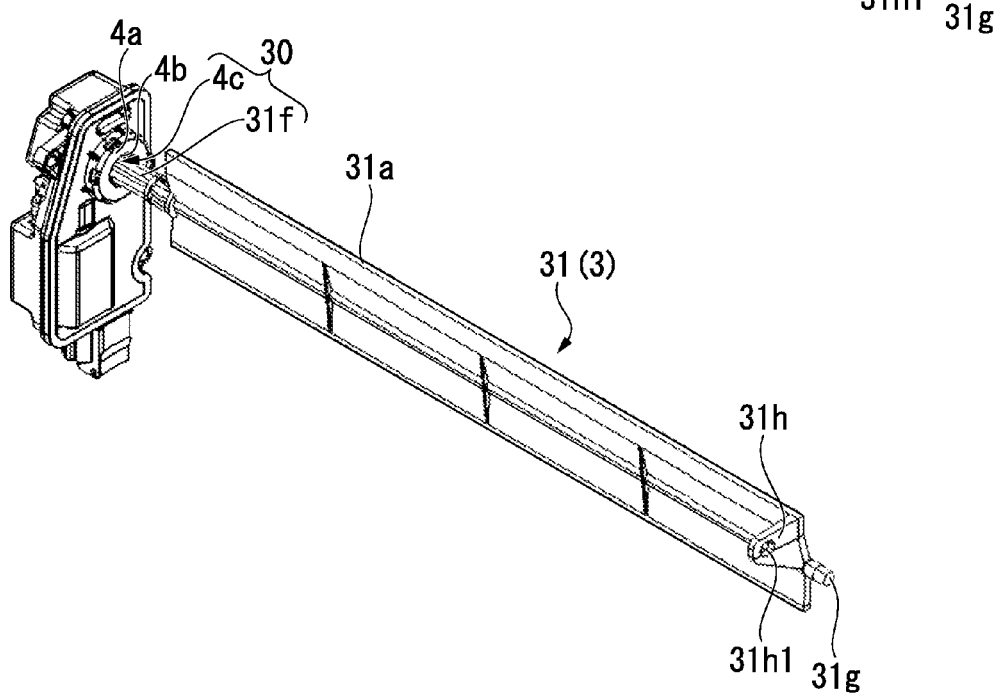
FIG. 2B is a perspective view when the drive flap member and the actuator included in the vehicle grill shutter in the first embodiment of the present invention are viewed from the side in which an engine room is arranged, and shows a state where the drive flap member and the actuator are connected to each other.

Subsequently, the attachment structure between the drive flap member 31 and the actuator 4 will be described. FIG. 2A is a perspective view when the drive flap member 31 and the actuator 4 are viewed from the side in which the engine room side is arranged, and is a perspective view in a state where the drive flap member 31 and the actuator 4 are disassembled. FIG. 2B is a perspective view showing a state where the drive flap member 31 and the actuator 4 are connected to each other. In addition, FIG. 3 is a perspective view when the drive flap member 31 is viewed from the side in which the actuator 4 is arranged.

Figure 3:
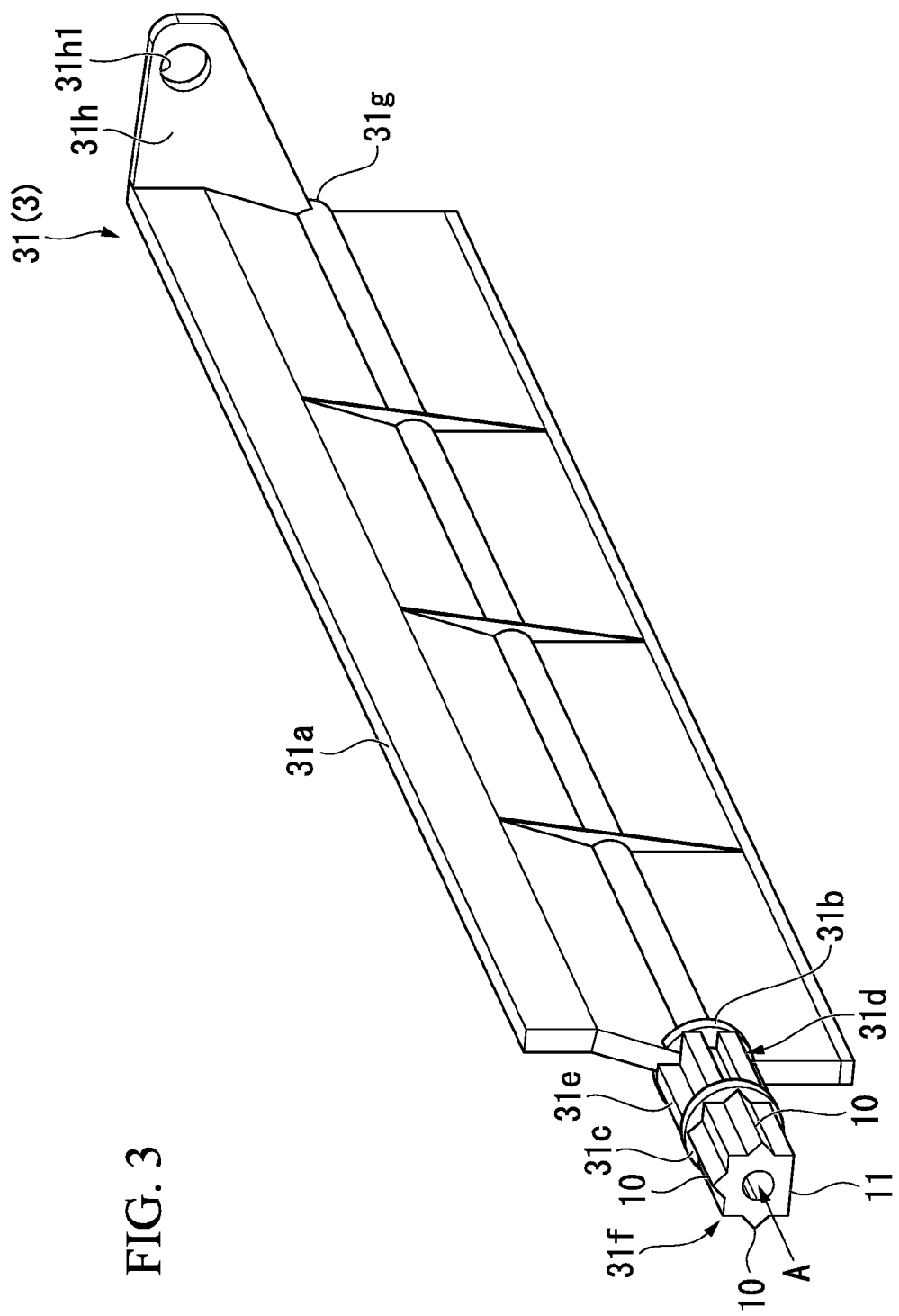
FIG. 3 is a perspective view when the drive flap member included in the vehicle grill shutter in the first embodiment of the present invention is viewed from in which the actuator side is arranged.

As shown in FIG. 3, the drive flap member 31 includes a flap main body 31a, a first flange 31b, a second flange 31c, breaking portions 31d (refer to FIG. 4), reinforcing ribs 31e, a shaft portion 31f, a support shaft 31g (refer to FIG. 2), and a link attachment plate 31h.

The flap main body 31a is a plate member which is partially bent, and is configured to shield the outside air as a shielding plate. The first flange 31b is provided on a side end of the actuator 4 side of the flap main body 31a, and is a disk-shaped portion which is disposed concentrically with the shaft portion 31f. The breaking portions 31d and the reinforcing ribs 31e are supported between the first flange 31b and the second flange 31c. The second flange 31c is disposed to be closer to the actuator 4 than the first flange 31b. The second flange 31c supports the breaking portions 31d and the reinforcing ribs 31e between the first flange 31b and the second flange 31c, and supports the shaft portion 31f on the surface of the actuator 4 side.

Figure 4:
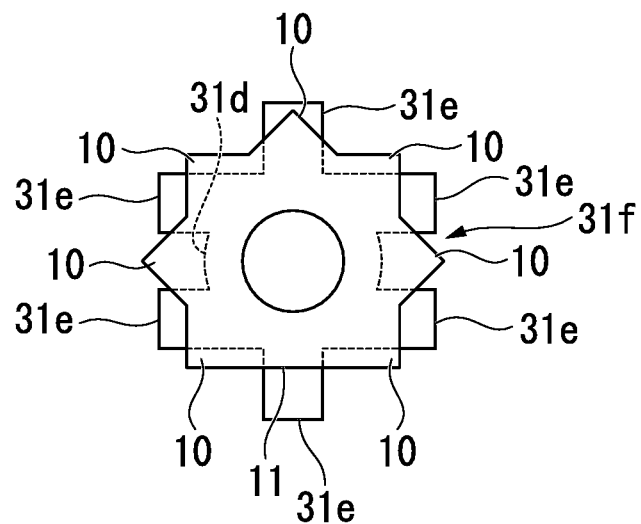
FIG. 4 is a view when viewed from A direction of FIG. 3.

FIG. 4 is a view when viewed from A direction of FIG. 3. In addition, in FIG. 4, in order to provide easy visual confirmation with respect to relationships between the shaft portion 31f and the reinforcing ribs 31e, the first flange 31b and the second flange 31c are omitted. As shown in FIG. 4, each of the breaking portions 31d is a portion having a smaller diameter than that of the shaft portion 31f. The breaking portions 31 are provided between the first flange 31b and the second flange 31c, and are interposed between the flap main body 31a and the shaft portion 31f. The strength of each of the breaking portions 31d is set so as to be broken when the actuator 4 attempts to rotate the drive flap member 31 in a case where an abnormal situation, in which foreign substances are stuck on the flap main body 31a or the like and the drive member 31 cannot rotate, occurs. Transmission of torque from the actuator 4 can be stopped by the breaking portions 31d before an excessive load is applied to the actuator 4. Therefore, it is possible to protect the actuator 4. As shown in FIG. 4, the plurality of reinforcing ribs 31e are provided so as to surround the breaking portions 31d, and are provided on the circumferential surfaces of the breaking portions 31d along the breaking portions 31d. The reinforcing ribs 31e receive the load acting on the breaking portions 31d in a bending direction. For example, the reinforcing ribs 31e can prevent the breaking portions 31d from being easily broken when the drive flap member 31 is attached to the actuator 4.

The shaft portion 31f is provided to protrude from the second flange 31c to the side in which the actuator 4 is arranged. The shaft portion 31f includes a plurality of teeth 10 and a notch portion 11 in the circumferential direction when viewed from an attachment direction (that is, the side in which the actuator 4 is arranged) with respect to the actuator 4. More specifically, when viewed from the attachment direction with respect to the actuator 4, the shaft portion 31f includes teeth 10 which are apexes of two squares having the same shapes when the two squares are shifted by 45° and overlap with each other, and the notch portion 11 which is formed by cutting one of the apexes. That is, the shaft portion 31f includes the plurality of (seven) teeth 10 which are arranged at equal intervals in the circumferential direction, and the notch portion 11 which is formed by cutting one of the plurality of teeth 10.

The shape when each of the teeth 10 is viewed from the attachment direction with respect to the actuator 4 is a rectangular isosceles triangle which is formed by perpendicularly connecting two sides. The teeth 10 engage with teeth 20 which are provided in a fitting hole 4c described below of the actuator 4, and transmit the rotary power generated by the actuator 4 to the drive flap member 31.

Due to the notch portion 11, the shape of the shaft portion 31f when viewed from the attachment direction with respect to the actuator 4 is rotationally asymmetrical. When the shaft portion 31f is fitted to the fitting hole 4c described below of the actuator 4 at a regular position, the notch portion 11 is disposed at a position at which the notch portion 11 overlaps an embedded portion 21 provided on the fitting hole 4c.

In the present embodiment, as shown in FIG. 3, the notch portion 11 is provided at the position immediately below when the drive flap member 31 is positioned at the closed position. As shown in FIG. 4, the position, at which the notch portion 11 is provided, is a position which overlaps with one of the reinforcing ribs 31e when viewed from the attachment direction of the shaft portion 31f with respect to the actuator 4. That is, one of the reinforcing ribs 31e is disposed so as to overlap with the notch portion 11 when viewed from the attachment direction of the shaft portion 31f with respect to the actuator 4.

Figure 5:
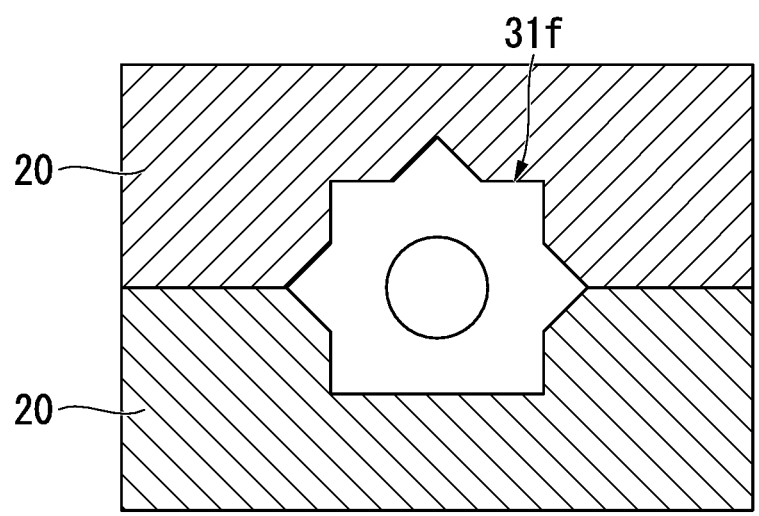
FIG. 5 is a schematic view for explaining a method of molding a shaft portion included in the vehicle grill shutter in the first embodiment of the present invention.

In addition, for example, as shown in FIG. 5, the shaft portion 31f having the above-described shape can be molded using two molds 200 without requiring a slide mold. Accordingly, it is possible to easily form the shaft portion 31f using injection molding.

The support shaft 31g and the link attachment plate 31h are provided on the end portion opposite to the shaft portion 31f of the flap main body 31a. The support shaft 31g is a pin-shaped portion which protrudes from the flap main body 31a toward the lateral side, and is inserted into the shaft hole 2c of the support column 2b. The link attachment plate 31h is a plate member which protrudes from the flap main body 31a toward the engine room side, and an attachment hole 31h1 which is configured to attach the link member 5 is provided on the link attachment plate 31h.

Figure 6:
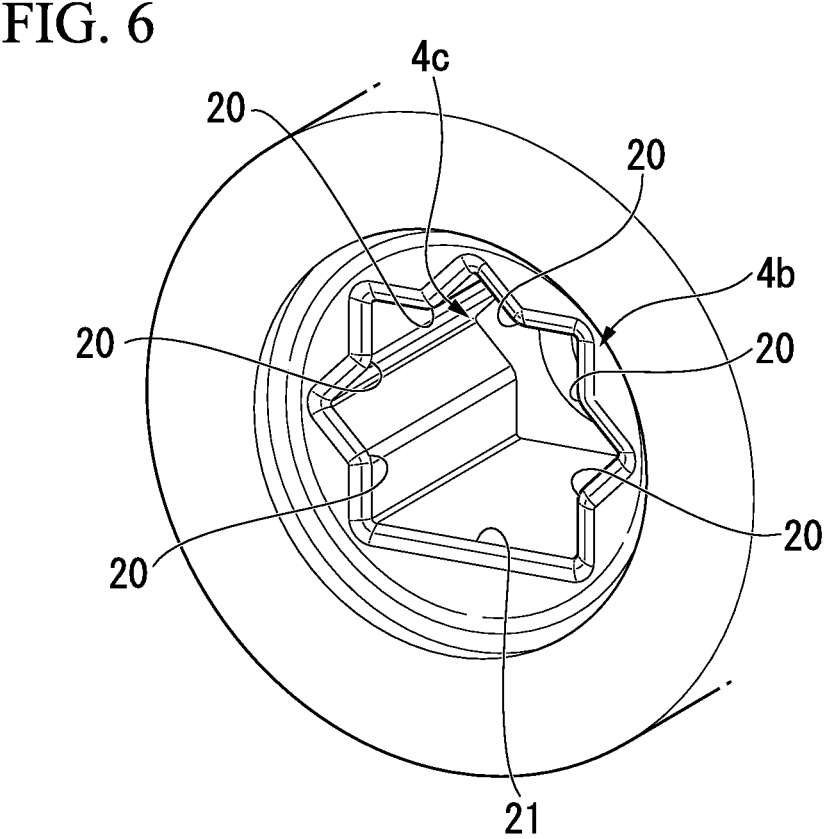
FIG. 6 is an enlarged view of the main portion of the actuator included in the vehicle grill shutter in the first embodiment of the present invention.

FIG. 6 is an enlarged view of the main portion of the actuator 4. The actuator 4 includes a bearing 4a (FIGS. 2A and 2B), and an attachment portion 4b. The bearing 4a rotatably supports the attachment portion 4b.

The attachment portion 4b includes the fitting hole 4c into which the shaft portion 31f of the drive flap member 31 is fitted. The fitting hole 4c is formed in a shape which includes the plurality of teeth 20 and the embedded portion 21 in the circumferential direction when viewed from the attachment direction (the side in which drive flap member 31 is arranged). More specifically, similarly to the shaft portion 31f, when viewed from the attachment direction with respect to the actuator 4, the fitting hole 4c includes teeth grooves which are apexes of two squares having the same shapes when the two squares are shifted by 45° and overlap each other, and the embedded portion 21 which is formed by embedding one of the apexes. The fitting hole 4c includes the plurality of teeth 20 which are arranged at equal intervals in the circumferential direction, and the embedded portion 21 which is formed by embedding one of the teeth grooves. In order to insert the shaft portion 31f into the fitting hole 4c, the fitting hole 4c is formed so that the shape formed by the inner wall surfaces of the fitting hole 4c when viewed from the insertion direction of the shaft portion 31f is slightly larger than the outer shape of the shaft portion 31 when viewed from the insertion direction of the shaft portion 31f, and in FIG. 6, the shape of the fitting hole 4c is similar to the outer shape of the shaft portion 31 when viewed from the insertion direction of the shaft portion 31f.

The shape of each of teeth 20 when viewed from the attachment direction of the drive flap member 31 is a rectangular isosceles triangle which is formed by perpendicularly connecting two sides. The teeth 20 engage with the teeth 10 of the shaft portion 31f, and transmit the rotary power generated by the actuator 4 to the drive flap member 31. The embedded portion 21 is a portion which opposes the notch portion 11 of the shaft portion 31f.

When the drive flap member 31 is attached to the fitting hole 4c, in a case where the position of the drive flap member 31 is not positioned at the regular position (that is, the notch portion 11 is not positioned immediately below), the embedded portion 21 interferes with the teeth 10 of the shaft portion 31f. Therefore, entering of the shaft portion 31f into the fitting hole 4c is prevented. In the present embodiment, the embedded portion 21 is provided at the position at which the position of the attachment portion 4b is immediately below when the drive flap member 31 is positioned at the closed position.

Moreover, in the vehicle grill shutter 1 according to the present embodiment, the shaft portion 31f of the drive flap member 31 and the fitting hole 4c of the actuator 4 configure an attachment position regulation mechanism 30.

When the drive flap member 31 is attached to the fitting hole 4c, only in the case where the position of the drive flap member 31 is positioned at the regular position, the drive flap member 31 can be attached to the actuator 4 by the attachment position regulation mechanism 30.

When the vehicle grill shutter 1 is assembled, in the case where the drive flap member 31 is attached to the actuator 4, first, the attachment portion 4b of the actuator 4 is positioned. Here, the attachment portion 4b is positioned so that the embedded portion 21 is positioned immediately below. Accordingly, the regular position of the drive flap member 31 with respect to the actuator 4 is the position at which the notch portion 11 is positioned immediately below, that is, the closed position.

Subsequently, the shaft portion 31f of the drive flap member 31 is inserted into the fitting hole 4c of the attachment portion 4b of the actuator 4. In this case, since the position of the attachment portion 4b is set so that the embedded portion 21 is positioned immediately the below, if the drive flap member 31 is not positioned at the closed position, the drive flap member 31 cannot be attached to the actuator 4. Accordingly, an operator inserts the shaft portion 31f into the fitting hole 4c so that the notch portion 11 is disposed immediately the below, with the notch portion 11 of the shaft portion 31f as a mark. In this way, according to the vehicle grill shutter 1 of the present embodiment, it is possible to attach the drive flap member 31 to the actuator 4 only when the drive flap member 31 is positioned at the regular position with respect to the actuator 4 by the attachment position regulation mechanism 30 which includes the shaft portion 31f of the drive flap member 31 and the fitting hole 4c of the actuator 4. Accordingly, it is possible to prevent the operator from incorrectly setting the attachment position of the drive flap member 31 with respect to the actuator 4, and it is possible to prevent erroneous assembly of the drive flap member 31 with respect to the actuator 4.

Moreover, in the vehicle grill shutter 1 according to the present embodiment, the attachment position regulation mechanism 30 includes the shaft portion 31*f* which is provided on the drive flap member 31 and in which the shape when viewed from the attachment direction is rotationally asymmetrical, and a fitting hole 4*c* which is provided on the actuator 4 and to which the shaft portion 31*f* is fitted. According to the vehicle grill shutter 1 of the present embodiment, it is possible to prevent erroneous assembly of the drive flap member 31 with respect to the actuator 4 with a simple structure.

In addition, in the vehicle grill shutter 1 according to the present embodiment, the shaft portion 31*f* includes a plurality of teeth 10 which are arranged at equal intervals in the circumferential direction and the notch portion 11 which is formed by cutting one of the plurality of teeth 10, and is formed in a rotationally asymmetrical shape. Moreover, according to the vehicle grill shutter 1 of the present embodiment, the operator can confirm the position of the shaft portion 31*f*, that is, the position of the drive flap member 31 while visually confirming the position of the notch portion 11. Therefore, it is possible to simplify the attachment operation of the drive flap member 31. In addition, for example, on the premise that the shape of the shaft portion 31*f* is rotationally asymmetrical, it is also possible to form the plurality of notch portions 11 by cutting two or more teeth among the teeth 10. However, an effective contact area of the torque transmission between the shaft portion 31*f* and the attachment portion 4*b* decreases as the number of teeth 10 decreases. Accordingly, preferably, the number of the notch portions 11 is one.

Moreover, in the vehicle grill shutter 1 according to the present embodiment, in order to prevent the breaking portions 31*d* from being broken during the attachment operation of the drive flap member 31 or the like, the reinforcing ribs 31*e* are provided on the circumferential surfaces of the breaking portions 31*d*. The breaking portions 31*d* are substantially thickened at the positions at which the reinforcing ribs 31*e* are provided. Therefore, the torsional stiffness also increases. However, in order to protect the actuator 4 as described above, the breaking portions 31*d* are required to be twisted off when excessive torque acts on the actuator. With respect to this, in the vehicle grill shutter 1 according to the present embodiment, the reinforcing ribs 31*e* are disposed to overlap with the notch portion 11 when the shaft portion 31*f* is viewed from the attachment direction. Since the locations to which strong torque is applied in the shaft portion 31*f* are the teeth 10, it is possible to dispose the reinforcing ribs 31*e* at positions far from the teeth 10 to which the strong torque is applied by disposing the reinforcing ribs 31*e* so as to overlap with the notch portion 11. Accordingly, it is possible to dispose the locations, at which the reinforcing ribs 31 are provided and the torsional stiffness increases, so as to be far from the teeth 10 to which strong torque is applied. Therefore, it is possible to assure the twisting off of the breaking portions 31*d* when excessive torque is applied.

Second Embodiment

Next, a second embodiment of the present invention will be described. In addition, in descriptions of the present embodiment, descriptions with respect to the portions similar to those of the first embodiment are omitted or simplified.

Figure 7:
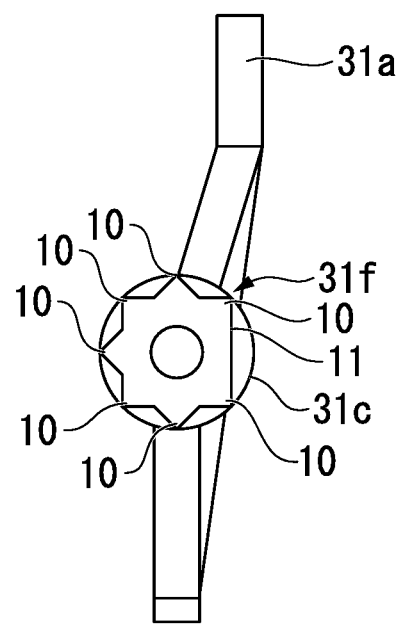
FIG. 7 is a side view when a drive flap member included in a vehicle grill shutter in a second embodiment of the present invention is viewed from an attachment direction of a shaft portion.

FIG. 7 is a side view when the drive flap member 31 included in a vehicle grill shutter in the present embodiment is viewed from the attachment direction of the shaft portion 31*f*. In the first embodiment, the notch portion 11 is provided so as to be positioned immediately below when the drive flap member 31 is positioned at the closed position. However, as shown in FIG. 7, in the present embodiment, the notch portion 11 is provided at the position horizontally separated from the center of the shaft portion 31*f*.

When the drive flap member 31 is positioned at the closed position, the drive flap member 31 receives the highest wind pressure from the front side (left side in FIG. 7) in the vehicle toward the rear side (right side in FIG. 7). In this case, in the present embodiment, since the notch portion 11 is provided at the position horizontally separated from the center of the shaft portion 31*f* when the drive flap member 31 is positioned at the closed position, the notch portion 11 is not disposed immediately above and immediately below. Accordingly, the teeth 10 are disposed immediately above and immediately below, and it is possible to receive the wind pressure with the teeth 10. Therefore, compared to the case where the notch portion 11 is disposed immediately above or immediately below when the drive flap member 31 is positioned at the closed position, it is possible to improve proof stress in the direction in which the wind pressure is received. In addition, it is possible to prolong the service life of the shaft portion 31*f*, and it is possible to decrease the frequency of replacement.

Third Embodiment

Subsequently, a third embodiment of the present invention will be described with reference to FIGS. 2 and 8 to 11. In addition, in the descriptions of the present embodiment, descriptions with respect to the portions similar to those of the first embodiment are omitted or simplified.

Figure 8:
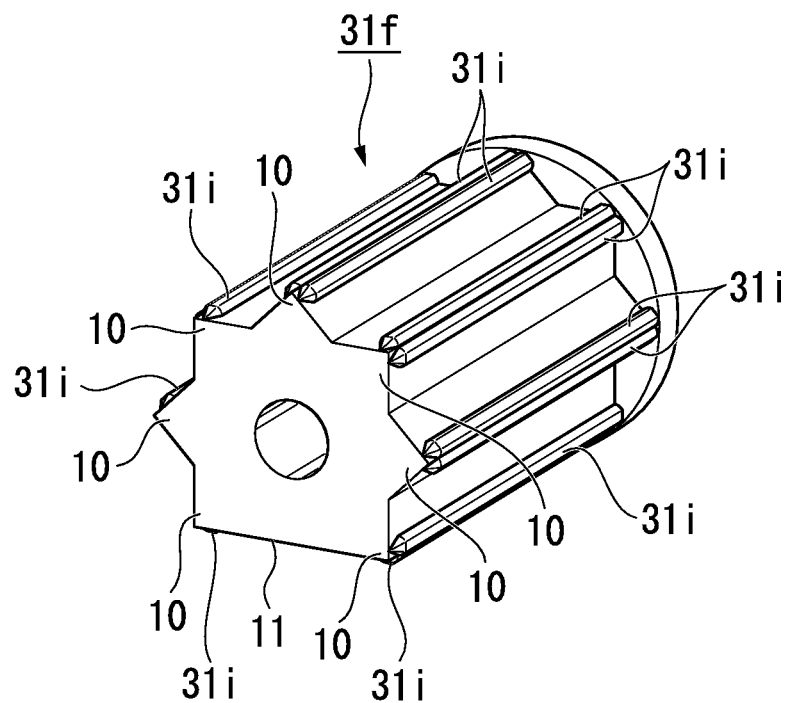
FIG. 8 is an enlarged perspective view showing the shaft portion of the drive flap member included in the vehicle grill shutter in a third embodiment of the present invention.

FIG. 8 is an enlarged perspective view of the shaft portion 31*f* included in the drive flap member 31.

As shown in FIG. 8, the drive flap member 31 according to the present embodiment includes vibration preventing ribs 31*i* (interposing portions).

Figure 9:
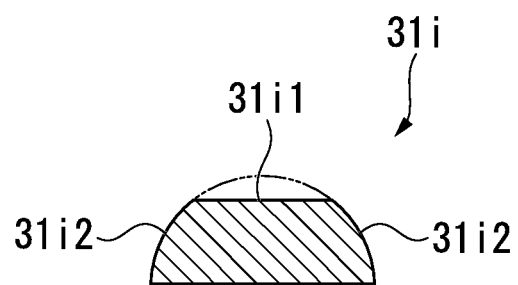
FIG. 9 is a sectional view of a vibration preventing rib included in the vehicle grill shutter in the third embodiment of the present invention.

As shown in FIG. 8, each of the vibration preventing ribs 31*i* is a protrusion which is provided integrally with the teeth 10 of the shaft portion 31*f* which has the plurality of teeth 10 in the circumferential direction and is formed in a gear shape. In addition, the protrusion protrudes from the surface of the tooth 10 toward the outside in the radial direction. As shown in FIG. 8, the section of each of the vibration preventing ribs 31*i* is formed in an approximately semicircular shape and extends in the direction along the axial center of the shaft portion 31*f*. In addition, the tip portion of the vibration prevention rib 31*i* has a shape which is pointed toward the tip side (that is, actuator 4 side) of the shaft portion 31*f*. That is, the shape of the vibration preventing rib 31*i* is set so that an amount (height) of the tip portion protruding from the tooth 10 decreases toward the tip. FIG. 9 is a section view of a region which is not the tip portion of the vibration preventing rib 31*i*. As shown in FIG. 9, in the vibration preventing rib 31*i*, a curvature radius of an apex 31*i*1 with respect to rising portions 31*i*2 increases and the apex 31*i*1 is flattened. In the vibration preventing rib 31*i*, the apex 31*i*1 comes into contact with the inner wall surface of the fitting hole 4*c*. In addition, in order to flatten the apex 31*i*1, the curvature radius of the apex 31*i*1 may be set to infinity.

Moreover, the vibration preventing rib 31*i* is set with respect to each of the teeth 10. Moreover, the vibration preventing rib 31*i* is set to each of both sides of the tooth 10 in the circumferential direction of the shaft portion 31*f* (refer to FIG. 11).

When the shaft portion 31*f* is fitted into the fitting hole 4*c* of the actuator 4, the vibration preventing rib 31*i* is interposed between the shaft portion 31*f* and the inner wall surface of the fitting hole 4*c*. That is, when the shaft portion 31*f* is fitted into the fitting hole 4*c* of the actuator 4, the vibration preventing rib 31*i* fills a gap which is formed between the shaft portion 31*f* and the inner wall surface of the fitting hole 4*c*, and prevents the shaft portion 31*f* from being changed (vibrated) by the fitting hole 4*c*.

Figure 10:
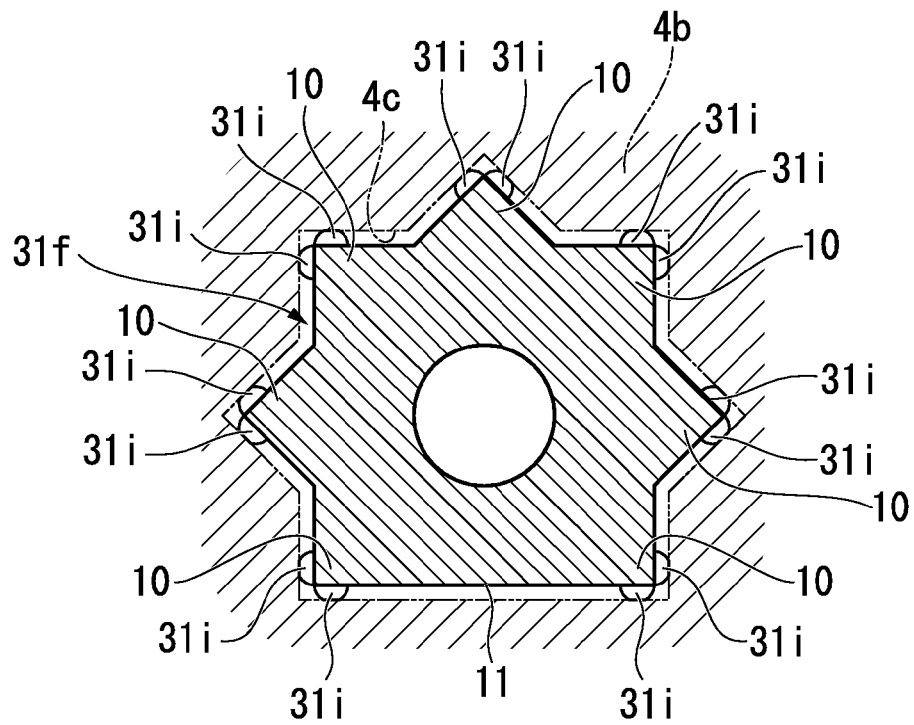
FIG. 10 is a schematic view showing the shaft portion and the vibration preventing rib included in the vehicle grill shutter in the third embodiment of the present invention.

FIG. 10 is a schematic view including the shaft portion 31*f* and the vibration preventing ribs 31*i*. As shown in FIG. 10, if the shaft portion 31*f* of the drive flap member 31 is fitted into the fitting hole 4*c*, the vibration preventing ribs 31*i* are interposed between the shaft portion 31*f* and the inner wall surface of the fitting hole 4*c*. Accordingly, the gap which is formed between the shaft portion 31*f* and the inner wall surface of the fitting hole 4*c* is filled by the vibration preventing ribs 31*i*, and the vibration of the shaft portion 31*f* in the fitting hole 4*c* is prevented. Therefore, according to the vehicle grill shutter 1 of the present embodiment, the variation of the shaft portion 31*f* with respect to the fitting hole 4*c* is prevented, and it is possible to prevent the occurrence of noise or the like. In addition, it is possible to correctly transmit the driving force of the actuator 4 to the drive flap member 31 through the vibration preventing ribs 31*i*.

Moreover, according to the vehicle grill shutter 1 of the present embodiment, the shaft portion 31*f* is formed in a gear shape including the plurality of teeth 10 arranged in the circumferential direction, and the vibration preventing ribs 31*i* is provided on both sides of each of the teeth 10. Accordingly, even when the shaft portion 31*f* rotates to any side in the circumferential direction, it is possible to cause the vibration preventing ribs 31*i* to correctly come into contact with the inner wall surface of the fitting hole 4*c*. For example, when the shaft portion 31*f* rotates to the right, the vibration preventing ribs 31*i* disposed on the right sides of the teeth 10 are strongly pressed to the inner wall surface of the fitting hole 4*c*. In addition, when the shaft portion 31*f* rotates to the left, the vibration preventing ribs 31*i* disposed on the left sides of the teeth 10 are strongly pressed to the inner wall surface of the fitting hole 4*c*. Accordingly, even when the shaft portion 31*f* rotates to any side in the circumferential direction, the vibration of the shaft portion 31*f* is prevented, and it is possible to prevent the occurrence of noise or the like. In addition, it is possible to correctly transmit the driving force of the actuator 4 to the drive flap member 31 through the vibration preventing ribs 31*i*.

Moreover, in the vehicle grill shutter 1 according to the present embodiment, the vibration preventing ribs 31*i* are configured of the protrusions which are provided integrally with the teeth 10 of the shaft portion 31*f*. Accordingly, it is not necessary to form the vibration preventing ribs 31 as independent components, and unlike in a case where the vibration preventing ribs 31*i* are formed as independent components, it is possible to decrease the number of components of the vehicle grill shutter 1.

In addition, in the vehicle grill shutter 1 according to the present embodiment, the vibration preventing ribs 31*li* are provided with respect to each of the teeth 10. In the vehicle grill shutter 1 according to the present embodiment, since the notch portion 11 which is formed by cutting one of the plurality of teeth 10 is provided, the load to be applied to the cut tooth 10 is applied to the teeth 10 adjacent to the notch portion 11.

Accordingly, the loads of the teeth 10 adjacent to the notch portion 11 increase compared to other teeth 10. Since the vibration preventing ribs 31*i* are provided with respect to each of the teeth 10, it is possible to disperse the load received from the fitting hole 4*c* by using the vibration preventing ribs 31*i* provided with respect to each of the teeth 10. As a result, it is possible to prevent a locally large stress from being applied to the teeth 10 adjacent to the notch portion 11. Therefore, it is possible to prolong the service life of the drive flap member 31.

Moreover, in the vehicle grill shutter 1 according to the present embodiment, the tip portion of the vibration preventing rib 31*i* is formed in a pointed shape in which the height of the vibration preventing rib 31*i* gradually decreases from the surface of the tooth 10 toward the tip of the shaft portion 31*f*. Accordingly, when the shaft portion 31*f* is inserted into the fitting hole 4*c*, it is possible to prevent the vibration preventing ribs 31*i* from being hooked to the edge of the fitting hole 4*c*, and it is possible to easily perform an assembly operation.

Moreover, in the vehicle grill shutter 1 according to the present embodiment, the vibration preventing rib 31*i* includes the apex 31*i*1 which comes into contact with the inner wall surface of the fitting hole 4*c*, and the apex 31*i*1 is flattened. For example, as shown by a virtual line in FIG. 9, when the apex 31*i*1 is formed having the same curvature radius as the rising portion 31*i*2, the contact range between the vibration preventing rib 31*i* and the inner wall surface of the fitting hole 4*c* decreases greatly. However, according to the vehicle grill shutter 1 of the present embodiment, since the apex 31*i*1 of the vibration preventing rib 31*i* is flattened, the contact area between the vibration preventing rib 31*i* and the inner wall surface of the fitting hole 4*c* becomes very large. Accordingly, it is possible to correctly transmit the driving force of the actuator 4 to the drive flap member 31 through the vibration preventing ribs 31*i*.

Hereinbefore, preferred embodiments of the present invention are described with reference the accompanying drawings. However, it goes without saying that the present invention is not limited to the embodiments. The shapes of constituent members in the above-described embodiments, combinations thereof, or the like are examples. Therefore, various modifications may be applied based on design requests or the like within a range which does not depart from the gist of the present invention.

For example, in the above-described embodiments, the example is described, in which the shaft portion 31*f* includes the plurality of teeth 10 arranged at equal intervals in the circumferential direction, and the notch portion 11 which is formed by cutting one of the plurality of teeth 10, and is formed in a rotationally asymmetrical shape. However, the present invention is not limited to this, and a shaft portion having other rotationally asymmetrical shapes may be adopted.

In addition, in the above-described embodiment, the example is described, in which in the shaft portion 31*f*, the squares having the same shapes are shifted by 45° and overlap with each other and one apex is cut. However, the present invention is not limited to this. That is, a shape may be adopted in which equilateral triangles having the same shapes are shifted by 180° and overlap with each other, and one apex is cut.

In addition, for example, in the third embodiment, the configuration is described, in which the vibration preventing ribs 31*i* are used as the interposing portions of the present invention. However, the present invention is not limited to this, and an interposing portion having a shape different from the vibration preventing rib 31*i* may be adopted. For example, a hemispherical protrusion or the like may be used as the interposing portion. Moreover, the interposing portion may be formed of a part separated from the shaft portion 31*f*. For example, an annular interposing portion may be attached to the periphery of the shaft portion 31*f*.

Figure 11:
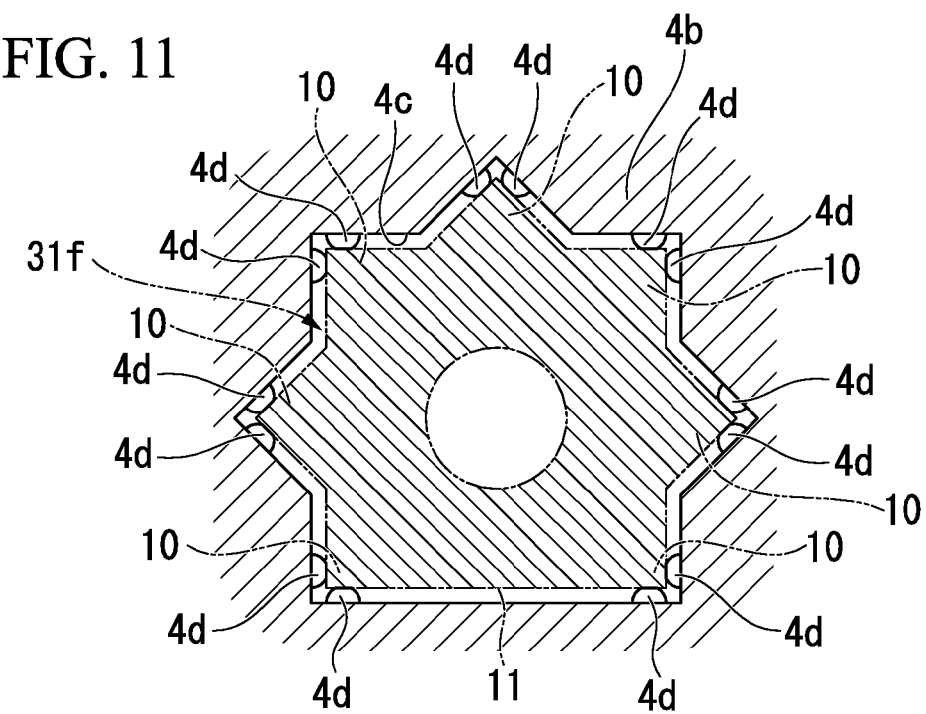
FIG. 11 is a schematic view showing a shaft portion and a vibration preventing rib included in a modification example of the vehicle grill shutter in the third embodiment of the present invention.

Moreover, in the third embodiment, the configuration in which the vibration preventing ribs 31*i* are provided integrally with the shaft portion 31*f* is described. However, the present invention is not limited to this. For example, as shown in FIG. 11, a configuration may be adopted, in which vibration preventing ribs 4*d* (interposing portions) are provided with respect to the inner wall surface of the fitting hole 4*c*. By using the actuator 4 including the vibration preventing ribs 4*d*, it is not necessary to provide the vibration preventing ribs 31*i* on the shaft portion 31*f*.

Moreover, in the third embodiment, the configuration in which only the tip portion of the vibration preventing rib 31*i* is formed in a pointed shape is adopted. However, the present invention is not limited to this. For example, the shape of the vibration preventing rib 31*i* may be a shape in which the height gradually decreases toward the tip over the entire region in the axial center direction of the shaft portion 31*f*.

Moreover, in the above-described embodiment, the configuration is adopted, in which the shaft portion 31*f* is provided on the drive flap member 31 and the fitting hole 4*c* is provided in the actuator 4. However, the present invention is not limited to this, a configuration may be adopted, in which the fitting hole is provided in the drive flap member and the shaft portion is provided on the actuator.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle grill shutter, comprising:
an actuator;
a flap member which is configured to rotate between a closed position and an open position by the actuator; and
an attachment position regulation mechanism which is configured to connect the actuator and the flap member only when the flap member is positioned at a regular position with respect to the actuator, wherein
the attachment position regulation mechanism includes:
a shaft portion which is provided on one of the actuator and the flap member, and has a rotationally asymmetrical shape when viewed from an attachment direction; and
an attachment portion having a fitting hole which is provided on an other of the actuator and the flap member and to which the shaft portion is fitted, and
the shaft portion includes a plurality of teeth which are arranged at equal intervals in a circumferential direction, and a notch portion which is formed by notching at least one of the plurality of teeth.

2. The vehicle grill shutter according to claim 1, wherein the flap member includes:
a flap main body;
the shaft portion;
a breaking portion which is interposed between the flap main body and the shaft portion and has a smaller diameter than a diameter of the shaft portion; and
a reinforcing rib which is provided along the breaking portion with respect to a circumferential surface of the breaking portion, wherein
the reinforcing rib is disposed to overlap with the notch portion of the shaft portion when viewed from the attachment direction.

3. The vehicle grill shutter according to claim 1, wherein the notch portion is disposed at a position at which the notch portion is horizontally separated from a center of the shaft portion when the flap member is positioned at the closed position.

4. A vehicle grill shutter, comprising:
an actuator;
a flap member in which a position is changed between a closed position and an open position by the actuator;
a shaft portion which is provided on one of the actuator and the flap member;
an attachment portion having a fitting hole which is provided on an other of the actuator and the flap member, and into which the shaft portion is fitted; and
an interposing portion which is interposed between the shaft portion and the inner wall surface of the fitting hole, wherein
the shaft portion has a gear shape which includes a plurality of teeth arranged in a circumferential direction,
the interposing portion is formed by a protrusion which is provided integrally with the tooth on both sides of the tooth in the circumferential direction of the shaft portion,
a notch portion which is formed by notching at least one of the plurality of teeth is provided, and
the protrusion is provided with respect to each of the teeth.

5. The vehicle grill shutter according to claim 4, wherein the protrusion extends in a direction along an axial center of the shaft portion, and a height of the protrusion from the surface of the tooth decreases toward a tip of the shaft portion.

6. The vehicle grill shutter according to claim 4, wherein the protrusion includes an apex which is configured to come into contact with an inner wall surface of the fitting hole, and the apex is flattened.

* * * * *